United States Patent [19]
Uwabo et al.

[11] Patent Number: 6,111,727
[45] Date of Patent: Aug. 29, 2000

[54] FLEXIBLE DISK COMPRISING A SUPPORTING HUB FOR SUPPORTING A MAGNETIC RECORDING MEDIUM INSIDE OF A BOTTOM PORTION

[75] Inventors: Tsuneo Uwabo, Hachioji; Yoshihiro Okano; Eiichi Yoneyama, both of Atsugi; Yoshinori Tangi, Hachiouji, all of Japan

[73] Assignee: Mitsumi Electric Co., Ltd., Tokyo, Japan

[21] Appl. No.: 09/135,356

[22] Filed: Aug. 17, 1998

[30] Foreign Application Priority Data

Aug. 20, 1997 [JP] Japan ..................... 9-223896

[51] Int. Cl.$^7$ .............. G11B 23/03; G11B 3/70
[52] U.S. Cl. ............................ 360/133; 369/291
[58] Field of Search .............. 360/133; 369/291

[56] References Cited

PUBLICATIONS

Essence Japanese–language brochure by Shoji Takahashi, 1989; pp. 160–161.

*Primary Examiner*—Allen T. Cao
*Attorney, Agent, or Firm*—Frishauf, Holtz, Goodman, Langer & Chick, P.C.

[57] ABSTRACT

In a flexible disk comprising a magnetic recording medium having an annular shape with a medium circular opening, a jacket for receiving the magnetic recording medium, and a supporting hub for supporting the magnetic recording medium, the supporting hub comprises a bottom portion and a supporting body which is integrally fixed on the bottom portion. The bottom portion is freely inserted in a jacket circular opening of the jacket. The bottom portion has a bottom diameter greater than a medium opening diameter of the medium circular opening. The supporting body has an external diameter which is substantially equal to the bottom diameter of the bottom portion. The supporting body includes a supporting rest for supporting the magnetic recording medium by adhesive bonding at an inner circumferential edge in a lower surface of the magnetic recording medium inside of the bottom portion.

23 Claims, 9 Drawing Sheets

FLEXIBLE DISK COMPRISING A SUPPORTING HUB FOR SUPPORTING A MAGNETIC RECORDING MEDIUM INSIDE OF A BOTTOM PORTION

BACKGROUND OF THE INVENTION

This invention relates to a flexible or floppy disk (which may be abbreviated to "FD") for use in a removable type magnetic recording/reproducing device such as a flexible or floppy disk drive (which may be abbreviated to "FDD").

As is well known in the art, the flexible disk of the type described comprises a magnetic recording medium and a jacket for receiving the magnetic recording medium. The magnetic recording medium comprises a flexible thin sheet composed of synthetic resin, a magnetic recording layer formed on a surface of the flexible thin sheet, and a coating layer formed on the magnetic recording layer.

On the other hand, the flexible disk drive of the type described is a device for carrying out data recording and reproducing operations to and from the magnetic recording medium of the flexible disk loaded therein. In recent years, the flexible disks have been more and more improved to have a larger storage capacity. Specifically, development has been made of the flexible disks having the storage capacity of 128 Mbytes (which may be called large-capacity FDs) in contrast with the flexible disks having storage capacity of 1 Mbytes or 2 Mbytes (which may be called small-capacity FDs). Following such development, the flexible disk drives have also improved to accept the large-capacity FDs for data recording and reproducing operations to and from the magnetic recording media of the large-capacity FDs. Furthermore, the large-capacity FDs have been more improved to have a larger storage capacity of 256 Mbytes, 512 Mbytes, . . . , and so on.

Throughout the present specification, flexible disk drives capable of recording/reproducing data for magnetic recording media of the large-capacity FDs alone will be referred to as high-density exclusive type FDDs. On the other hand, flexible disk drives capable of recording/reproducing data for magnetic recording media of the small-capacity FDs alone will be called low-density exclusive type FDDs. Furthermore, flexible disk drives capable of recording/ reproducing data for magnetic recording media of both the large-capacity and the small-capacity FDs will be called high-density/low-density compatible type FDDs. In addition, the high-density exclusive type FDDs and the high-density/low-density compatible type FDDs will collectively be called high-density type FDDs.

The low-density exclusive type FDD and the high-density type FDD are different in mechanism from each other in several respects, one of which will presently be described. In either FDD, a pair of magnetic heads is supported by a carriage which is driven by a drive arrangement to move in a predetermined radial direction with respect to the magnetic disk medium of the flexible disk loaded in the flexible disk drive. The difference resides in the structure of the structure of the drive arrangement. More specifically, the low-density exclusive type FDD uses a stepping motor as the drive arrangement. On the other hand, the high-density type FDD uses a linear motor such as a voice coil motor (which may be abbreviated to "VCM") as the drive arrangement.

Now, description will be made as regards the voice coil motor used as the drive arrangement in the high-density type FDD. The voice coil motor comprises a voice coil and a magnetic circuit. The voice coil is disposed on the carriage at a rear side and is wound around a drive axis extending in parallel to the predetermined radial direction. The magnetic circuit generates a magnetic field in a direction intersecting that of an electric current flowing through the voice coil. With this structure, by causing the electric current to flow through the voice coil in a direction intersecting that the magnetic field generated by the magnetic circuit, a drive force occurs in a direction extending to the axis on the basis of interaction of the electric current with the magnetic field. The drive force causes the voice coil motor to move the carriage in the predetermined radial direction.

Another difference between the low-density exclusive type FDD and the high-density type FDD resides in the number of revolutions of a spindle motor for rotating the magnetic recording medium of the flexible disk loaded therein. More specifically, the low-density exclusive type FDD may rotate the magnetic recording medium of the small-capacity FD loaded therein at a low rotation speed of either 300 rpm or 360 rpm. On the other hand, the high-density type FDD can admit, as the flexible disk to be loaded thereinto, either the large-capacity FD alone or both of the large-capacity FD and the small-capacity FD. As a result, when the large-capacity FD is loaded in the high-density type FDD, the spindle motor for the high-density type FDD must rotate the magnetic recording medium of the large-capacity FD loaded therein at a high rotation speed of 3,600 rpm which is equal to ten or twelve times as large as that of the small-capacity FD.

In the meanwhile, the large-capacity FD generally has an external configuration identical with that of the small-capacity FD. Specifically, both of the large-capacity and the small-capacity FDs have a flat rectangular shape of a width of 90 mm, a length of 94 mm, and a thickness of 3.3 mm in case of a 3.5-inch type. However, the large-capacity FD has a narrower track width (track pitch) than that of the small-capacity FD. As a result, it is difficult for the large-capacity FD to position a magnetic head of the high-density type FDD on a desired track in the magnetic recording medium thereof in contrast with the small-capacity FD. Accordingly, a servo signal for position detection is preliminarily written in the magnetic recording medium of the large-capacity FD.

In addition, the flexible disk is called a disk cartridge in the manner known in the art. The disk cartridge comprises the magnetic recording medium and upper and lower shells for receiving the magnetic recording medium with a space left therebetween. A combination of the upper and the lower shells is referred to as the jacket. The upper and the lower shells are provided with upper and lower head windows, respectively, to permit an access to the magnetic recording medium by a pair of magnetic heads. The magnetic recording medium is made of a magnetic material having a flexibility. That is, as described above, the magnetic recording medium comprises the flexible thin sheet composed of synthetic resin, the magnetic recording layer formed on the surface of the flexible thin sheet, and the coating layer formed on the magnetic recording layer.

The magnetic recording medium has an annular shape with a media circular opening formed at its center to be concentric with a center axis of the magnetic recording medium. The magnetic recording medium is supported at the periphery of the media circular opening by a supporting hub through a double-sided adhesive tape called an A ring in the art. The supporting hub is called a metal hub or a center hub.

A conventional supporting hub is generally made by press molding of a metal plate. Specifically, the supporting hub has a substantially dish shape and comprises a concave portion at its center thereof and an outer circumferential portion at the periphery of the concave portion. That is, the concave portion consists of a cylindrical portion and a circular bottom portion. In addition, the outer circumferential portion is called a flange portion which is formed at the upper end of the cylindrical porition. The jacket or the lower shell has a shell circular opening which serves to expose the concave portion of the supporting hub to the exterior of the jacket. In addition, the supporting hub serves to chuck the flexible disk at a disk holder table of the flexible disk drive. Specifically, the supporting hub has a hub center hole formed at its center and a chucking hole formed at a position eccentric with the hub center hole. The disk holder table is rotatably driven by a spindle motor. The spindle motor comprises a spindle shaft to which the disk holder table is fixed at an upper portion thereof. The disk holder table is provided with a chucking pin formed thereon. The spindle shaft and the chucking pin are inserted to the hub center hole and the chucking hole to rotate the magnetic recording medium of the flexible disk in a predetermined rotation direction.

In the conventional supporting hub, a lower surface of the outer circumferential portion is adhered by the A ring to an upper surface of the magnetic recording medium at the periphery of the medium circular hole. Specifically, the concave portion has a concave diameter while the outer circumferential portion has an outer diameter. Accordingly, the media circular opening of the magnetic recording medium has a medium opening diameter which is greater than the concave diameter and is smaller than the outer diameter. Inasmuch as the concave diameter of the concave portion is substantially equal to 25 mm in case of the 3.5-inch type flexible disk, the medium opening diameter of the magnetic recording medium is greater than 25 mm in case of the 3.5-inch type flexible disk. In addition, the supporting hub may be adhered to the magnetic recording medium by the use of an adhesive instead of the A ring.

As described above, the magnetic recording medium is adhered to the supporting hub. Thus, only the upper surface of the magnetic recording medium is supported by the supporting hub. In other words, the magnetic recording medium is supported only at its one surface. As a result, the magnetic recording medium may suffer occurrence of stuck wrinkles. Such stuck wrinkles occur remarkably in the vicinity of medium stuck positions where the magnetic recording medium is adhered to supporting hub. When the magnetic heads of the flexible disk drive are brought into contact with the magnetic recording medium for writing/reading operations, the contact (hereinafter called "head touch") becomes unstable in the presence of such stuck wrinkles. In this event, it is difficult for the magnetic heads to perform stable data writing/reading operations upon the magnetic recording medium and it results in occurrence of writing/reading errors. This is because the writing/reading operations for the magnetic recording medium by the magnetic heads are carried out in a data writing/reading area in the vicinity of the medium stuck positions. Such problem is particularly serious when the magnetic recording medium is rotated at a high speed, for example, at 3,600 rpm in case where the flexile disk is the large-capacity FD. This is because the large-capacity FD has a narrower track width (track pitch) than that of the small-capacity FD as mentioned before.

SUMMARY OF THE INVENTION

It is therefore an object of the present invention to provide a flexible disk which is capable of preventing the occurrence of writing/reading errors caused by stuck wrinkles in a magnetic recording medium.

Other objects of this invention will become clear as the description proceeds.

According to a first aspect of this invention, a flexible disk comprises a magnetic recording medium having an annular shape with a medium circular opening formed at its center. A jacket receives the magnetic recording medium. The jacket comprises upper and lower shells between which the magnetic recording medium is interposed. The lower shell has a jacket circular opening formed at its center. A supporting hub supports the magnetic recording medium. The supporting hub comprises a bottom portion and a supporting body. The bottom portion is freely inserted in the jacket circular opening with the bottom portion exposed to the exterior of the jacket. The supporting body is integrally fixed on the bottom portion. The supporting body includes a supporting rest for supporting the magnetic recording medium by adhering at an inner circumferential edge in a lower surface of the magnetic recording medium inside of the bottom portion.

According to a second aspect of this invention, a supporting hub is for supporting a magnetic recording medium having an annular shape with a medium circular opening formed at its center. The supporting hub comprises a bottom portion and a supporting body integrally fixed on the bottom portion. The supporting body includes a supporting rest for supporting the magnetic recording medium by adhering at an inner circumferential edge in a lower surface of the magnetic recording medium inside of the bottom portion.

DESCRIPTION OF THE PREFERRED EMBODIMENT

Figure 1:
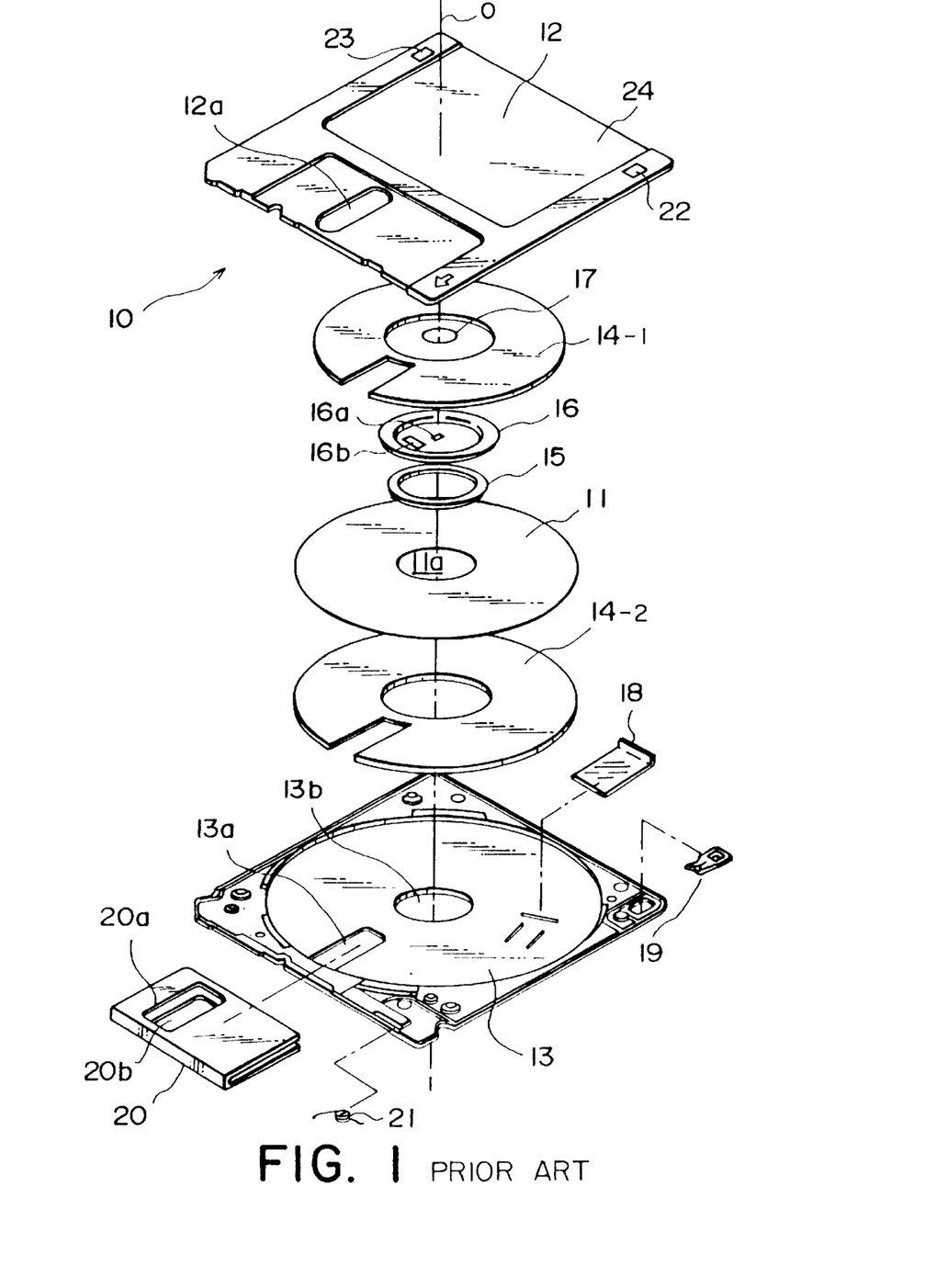
FIG. 1 is an exploded perspective view showing a structure of a 3.5-inch floppy disk as an example of a conventional disk cartridge.

Referring to FIG. 1, a conventional flexible disk or disk cartridge will be described at first in order to facilitate an understanding of the present invention. In the example being illustrated, the flexible disk or disk cartridge is a 3.5-inch floppy disk. Such a floppy disk is disclosed in Japanese book entitled "The Whole of Floppy Disk Apparatus" written by Shoji Takahashi and published by CQ publishing Co., Ltd. on Jul. 10, 1990, page 160.

As shown in FIG. 1, the floppy disk depicted at 10 comprises a magnetic recording medium 11, an upper shell 12, a lower shell 13, an upper liner 14-1 adhered to an inner surface of the upper shell 12, and a lower liner 14-2 adhered to an inner surface of the lower shell 13. The magnetic recording medium 11 is received between the upper and the lower liners 14-1 and 14-2. Herein, a combination of the upper shell 12 and the lower shell 13 will be referred to as a jacket. That is, the magnetic recording medium 11 is received in the jacket.

The jacket is made by molding of synthetic resin. Specifically, the jacket is composed of the combination of the upper shell 12 and the lower shell 13 each of which is generally made by injection molding.

The upper and the lower liners 14-1 and 14-2 serve to remove fine dust attracted to the surfaces of the magnetic recording medium 11. The jacket is provided with a head window to enable an access by a pair of magnetic heads (not shown) of a flexible disk drive (not shown in FIG. 1) which will later be described. Specifically, the head window is composed of upper and the lower head windows 12a and 13a as rectangular holes formed in the upper and the lower shells 12 and 13, respectively.

The magnetic recording medium 11 has an annular shape with a medium circular opening 11a formed at its center to be concentric with a center axis 0 of the magnetic recording medium 11. The magnetic recording medium 11 is made of a magnetic material having a flexibility. That is, the magnetic recording medium 11 comprises the flexible thin sheet composed of synthetic resin, magnetic recording layers formed on both surfaces of the flexible thin sheet, and coating layers formed on the magnetic recording layers. The magnetic recording medium 11 is supported at the periphery of the medium circular opening 11a by a supporting hub 16 through a double-sided adhesive tape 15 called an A ring. The supporting hub 16 is called a metal hub.

Referring to FIGS. 2 and 3A through 3C in addition to FIG. 1, the metal hub 16 is generally made by press molding of a metal plate. Specifically, the metal hub 16 has a substantially dish shape and comprises a concave portion at its center thereof and an outer circumferential portion 163 at the periphery of the concave portion. That is, the concave portion consists of a cylindrical portion 161 and a circular bottom portion 162. In addition, the outer circumferential portion 163 is called a flange portion which is formed at the upper end of the cylindrical portion 161.

Figure 2:
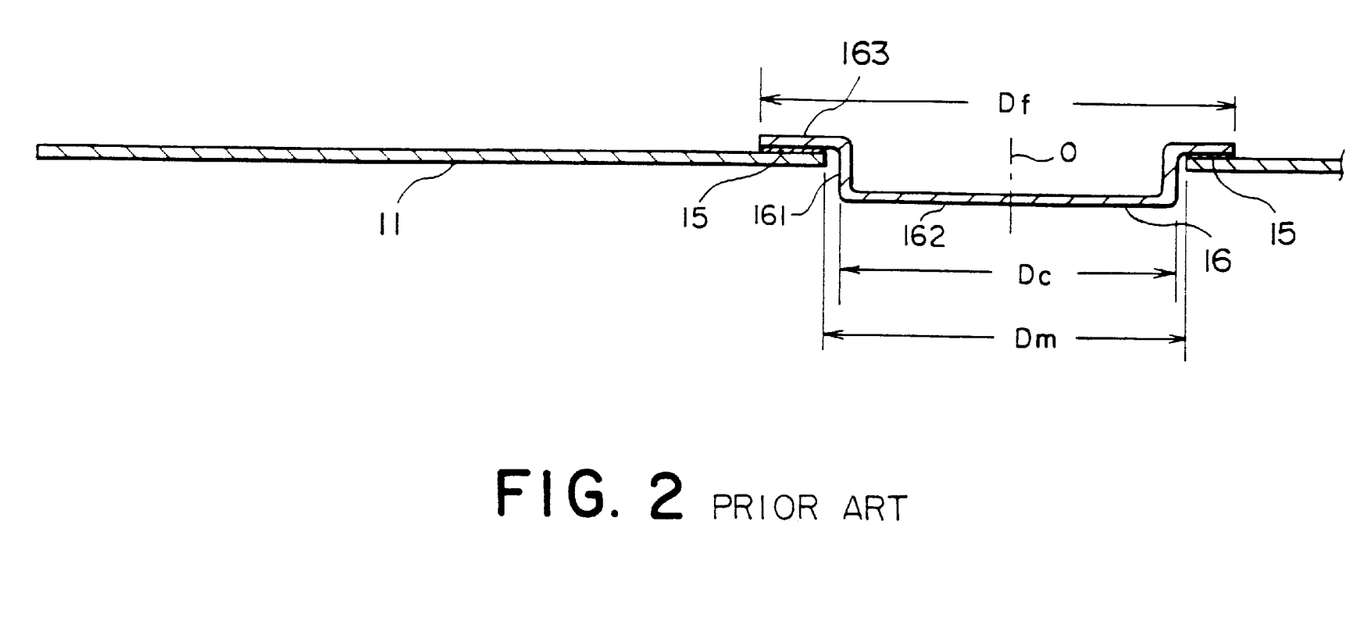
FIG. 2 is a sectional view of a part of a combination of a conventional magnetic recording medium and a conventional supporting hub in the floppy disk illustrated in FIG. 1.

As shown in FIG. 2, the cylindrical portion has a cylindrical outer diameter depicted at $D_c$, the medium circular opening 11a of the magnetic recording medium 11 has a medium opening diameter depicted at $D_m$, and the flange portion 163 has a flange outer diameter depicted at $D_f$. The cylindrical outer diameter $D_c$ is called a concave diameter. The cylindrical outer diameter $D_c$ is smaller than the medium opening diameter $D_m$ while the flange outer diameter $D_f$ is greater than the medium opening diameter $D_m$. The cylindrical portion 161 is fitted into the medium circular opening 11a of the magnetic recording medium 11 to be concentric therewith. A upper surface of the magnetic recording medium 11 is adhered by the A ring 15 to a lower surface of the flange portion 163 at the periphery of the medium circular opening 11a.

Turning back to FIG. 1, a center plate 17 is interposed between the metal hub 16 and the upper shell 12. To the lower shell 13, a lifter 18 and a write protector 19 are attached. The lifter 18 serves to press the lower liner 14-2 against the magnetic recording medium 11. The lower shell 13 is provided with a shell or jacket circular opening 13b which serves to expose the bottom portion 162 of the metal hub 16 to the exterior of the jacket.

The floppy disk 10 further comprises a metal shutter 20 for opening and closing the upper and the lower head windows 12a and 13a. The metal shutter 20 is usually made by folding of a metal plate. The shutter 20 is closed when the floppy disk 10 is not loaded in the flexible disk drive. This prevents fine dust and various contaminants from entering into the jacket and makes it difficult for an operator's finger to erroneously touch a recording surface of the magnetic recording medium 11. The shutter 20 has a shutter window for bringing the upper and the lower head windows 12a and 13a into an open state. Specifically, the shutter window has an upper shutter window 20a as a rectangular hole formed in an upper plate of the shutter 20a at a position corresponding to the upper head window 12a, and a lower shutter window 20b as a rectangular hole formed in a lower plate of the shutter 20 at a position corresponding to the lower head window 13a. The shutter 20 is urged by a shutter spring 21 attached to the lower shell 13 in a closing direction depicted at A in FIG. 3A.

Figure 3A:
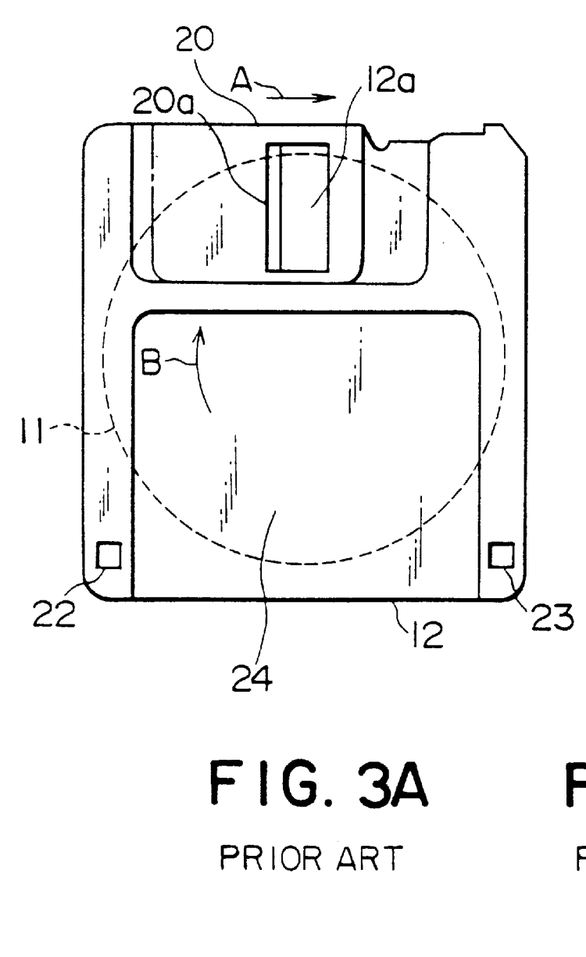
FIGS. 3A through 3C collectively show an external appearance of the floppy disk illustrated in FIG. 1.
Figures 3B, 3C:
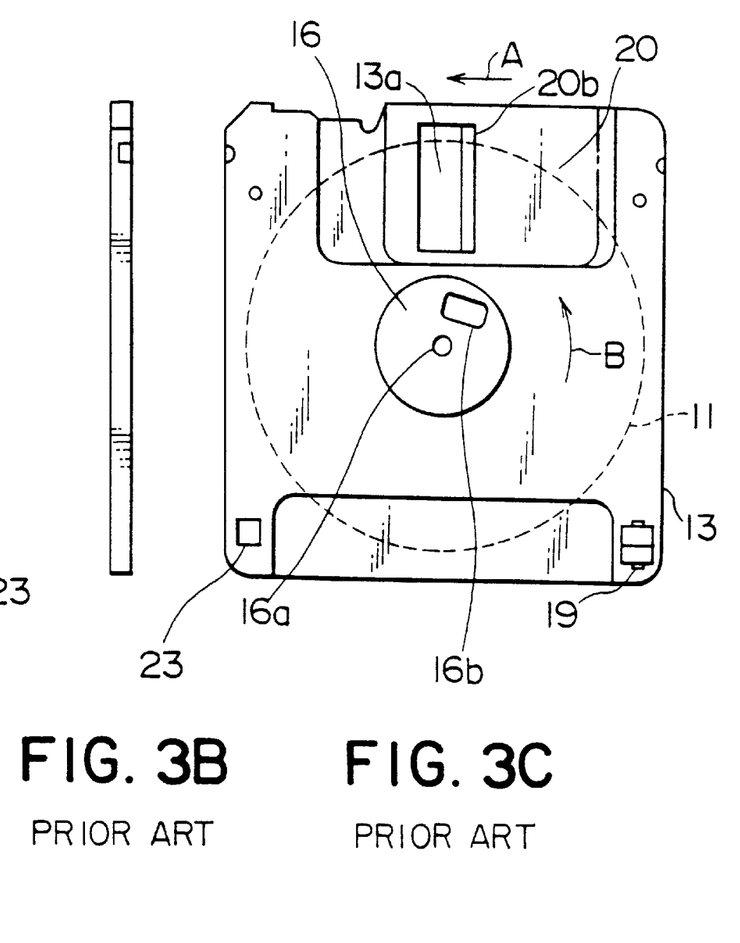

Referring to FIGS. 3A and 3C, the shutter 20 is slid against the urging force of the shutter spring 21 (FIG. 1) in a direction reverse to the closing direction A. In this state, the shutter 20 is in an open state to expose the upper and the lower head windows 12a and 13a.

In the manner which will later become clear, the metal hub 16 serves to chuck the flexible disk 10 at a disk holder table (not shown) of the flexible disk drive. Specifically, the metal hub 16 has a hub center hole 16a formed at its center and a chucking hole 16b formed at a position eccentric with the hub center hole 16a. The disk holder table is rotatably driven by a spindle motor (not shown). The spindle motor comprises a spindle shaft (not shown) to which the disk holder table is fixed at an upper portion thereof. The disk holder table is provided with a chucking pin (not shown) formed thereon. The spindle shaft and the chucking pin are inserted to the hub center hole 16a and the chucking hole 16b to rotate the magnetic recording medium 11 of the floppy disk in a predetermined rotation direction depicted at B in the figure.

The write protector 19, which is called a write protect tab, serves to switch opened/closed states of a write protect hole 22 formed in the jacket to inhibit a writing operation. When the write protect hole 22 is closed and opened by moving the write protector 19, the floppy disk 10 is put into a write enable state and a write inhibit state, respectively. The jacket is further provided with a hole 23 to identify the floppy disk as a high-density (HD) type. The upper shell 12 has a label area 24 formed on an upper surface thereof.

It is noted here that the floppy disk 10 illustrated in FIG. 1 has a normal or small storage capacity of 1 Mbyte or 2 Mbytes. A large-capacity floppy disk having s storage capacity of as large as 128 Mbytes does not include the lifter 18.

Figure 4A:
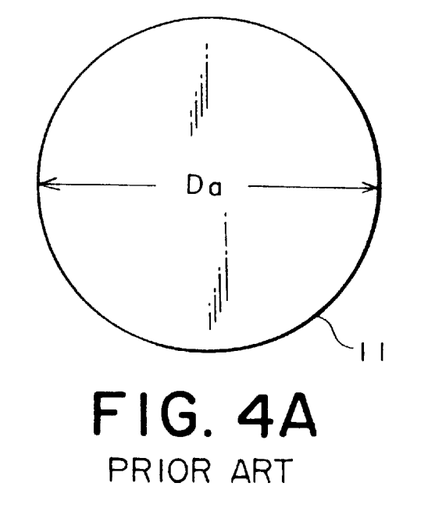
FIGS. 4A through 4D are views for describing a manufacturing process of the combination of the conventional magnetic recording medium and the conventional supporting hub illustrated in FIG. 2 and its disadvantages.
Figure 4B:
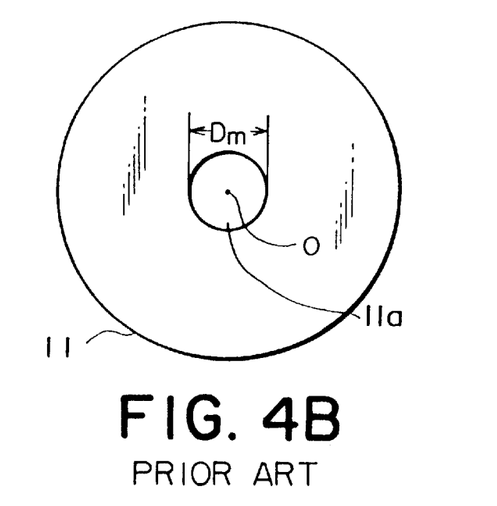
Figure 4C:
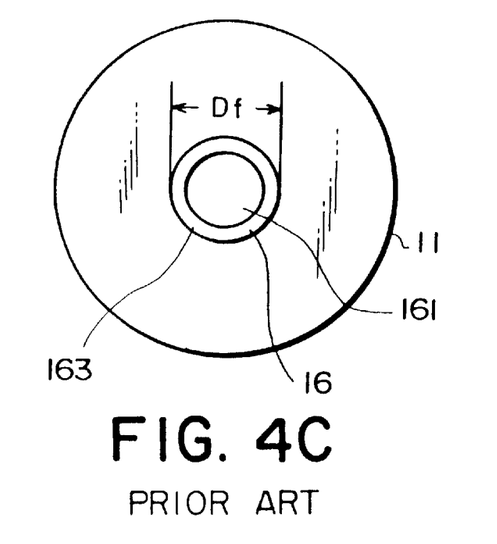

Referring also to FIGS. 4A through 4D, description will be made about a method of manufacturing the combination of the magnetic recording medium 11 and the metal hub 16 illustrated in FIG. 1. As illustrated in FIG. 4A, the magnetic recording medium 11 of a circular shape having a disk diameter Dd is at first prepared. The magnetic recording medium 11 has a thickness of about 62 μm. Subsequently, a center portion of the magnetic recording medium 11 is removed to form the medium circular opening 11a having the medium opening diameter Dm, as illustrated in FIG. 4B. The medium circular opening 11a has a center coincident with the center axis O. Then, as illustrated in FIG. 4C, the metal hub 16 is adhered to the upper surface of the magnetic recording medium 11 by the A ring 15. The metal hub 16 may be adhered to the magnetic recording medium 11 by the use of an adhesive instead of the A ring 15.

As described above, in the conventional supporting hub 16, the lower surface of the outer circumferential portion 163 is adhered by the A ring 15 to the upper surface of the magnetic recording medium 11 at the periphery of the medium circular opening 11a. In addition, the media circular opening 11a of the magnetic recording medium 11 has the medium opening diameter $D_m$ which is greater than the cylindrical outer or concave diameter $D_c$ and is smaller than the flange outer diameter $D_f$. Inasmuch as the concave diameter $D_c$ of the cylindrical portion 161 is substantially equal to 25 mm, the medium opening diameter $D_m$ of the magnetic recording medium 11 is greater than 25 mm. Furthermore, only the upper surface of the magnetic recording medium 11 is supported by the supporting hub 16. In other words, the magnetic recording medium 11 is supported only at its one surface.

Figure 4D:
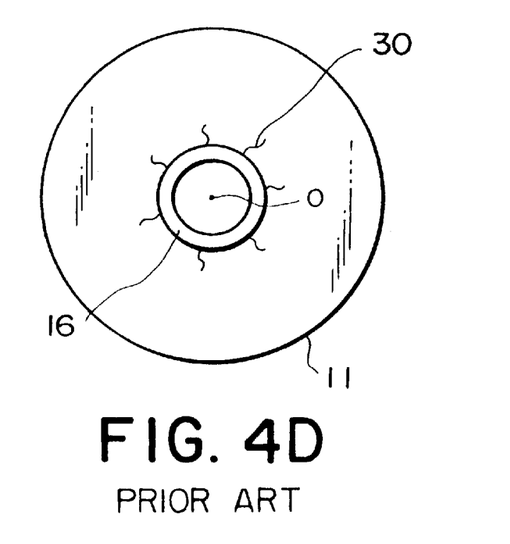

As a result, the magnetic recording medium 11 may suffer occurrence of stuck wrinkles 30, as illustrated in FIG. 4D. Such stuck wrinkles 30 occur remarkably in the vicinity of medium stuck positions where the magnetic recording medium 11 is adhered to the supporting hub 16. When the magnetic heads of the flexible disk drive are brought into contact with the magnetic recording medium 11 for writing/reading operations, the contact or "head touch" becomes unstable in presence of such stuck wrinkles 30. In this event, it is difficult for the magnetic heads to perform stable data writing/reading operations upon the magnetic recording medium 11 and it results in occurrence of writing/reading errors. This is because the writing/reading operations for the magnetic recording medium 11 by the magnetic heads are carried out in a data writing/reading area in the vicinity of the medium stuck positions. Such problem is particularly serious when the magnetic recording medium is rotated at a high speed, for example, at 3,600 rpm in case where the flexile disk is the large-capacity FD. This is because the large-capacity FD has the narrower track width (track pitch) than that of the small-capacity FD as mentioned before.

Figure 5:
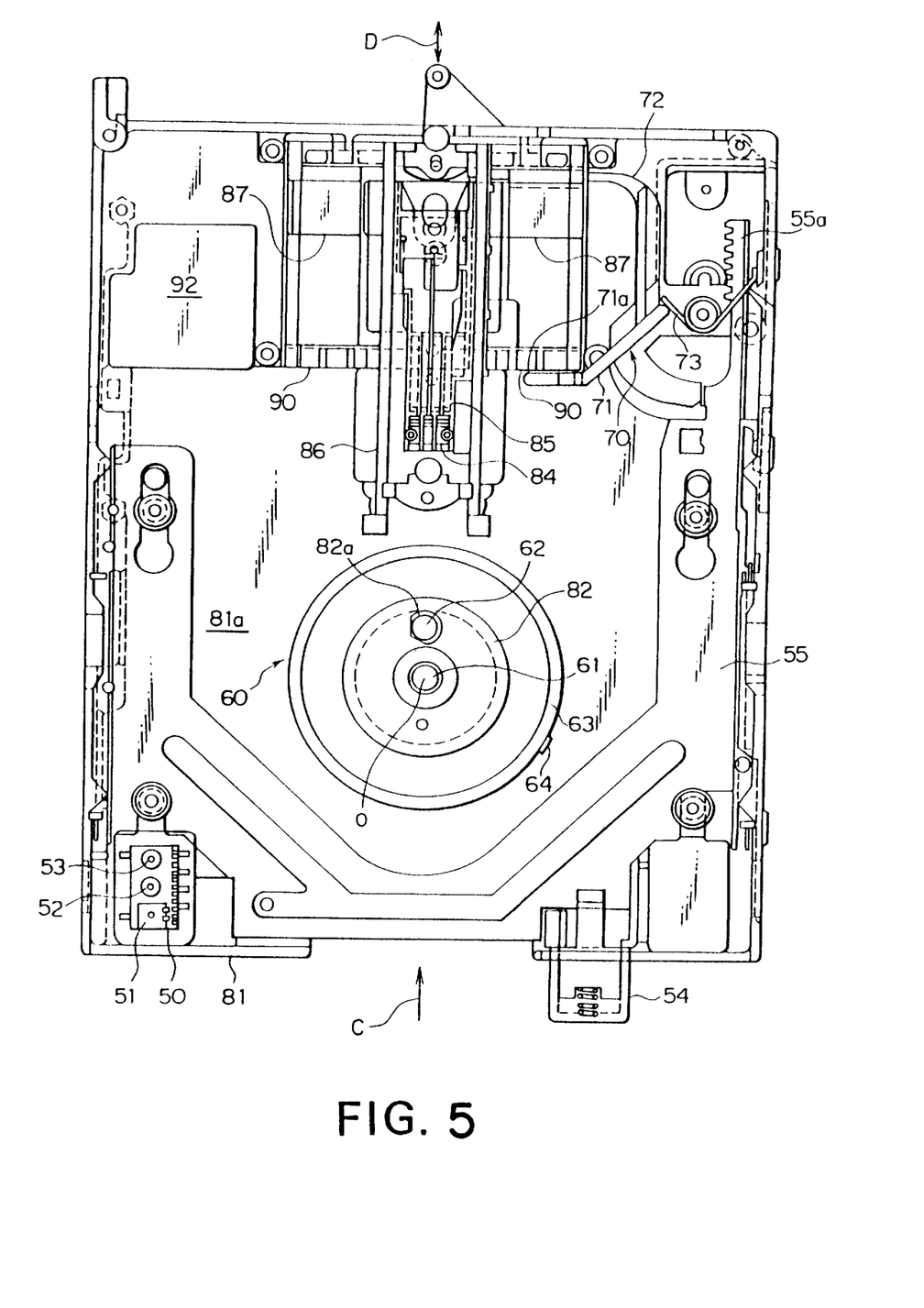
FIG. 5 is a plan view of a high-density type flexible disk drive (FDD) to which this invention is applicable.

Referring to FIG. 5, description will proceed to a high-density type flexible disk drive (FDD) to which this invention is applicable. The illustrated high-density type FDD is a high-density/low-density compatible type FDD which enable to carry out recording/reproducing of data for magnetic recording media of both a large-capacity and a small-capacity flexible disks (FDs) which will later be described. The flexible disk is loaded into the high-density type FDD from an insertion direction indicated by an arrow C in FIG. 5. FIG. 5 shows a state where the flexible disk is loaded into the high-density type FDD. The flexible disk has a disk center axis (not shown).

The high-density type FDD comprises a main frame 81 having a main surface 81a and a disk holder table 82 which is rotatably supported on the main surface 81a of the main frame 81. The disk holder table 82 has a table center axis O which acts as the axis of the rotation. The loaded flexible disk is held on the disk holder table 82 so that the table center axis 0 coincides with the disk center axis. The disk holder table 82 is rotatably driven by a spindle motor (SPM) 60. The spindle motor 60 is mounted on the main frame 81 with the spindle motor 60 put into a state embedded in a concave portion (not shown) of the main frame 81, thereby the magnetic recording medium of the flexible disk rotates at a desired rotation speed in the manner which will become clear. In addition, the main frame 81 has a back surface (not shown) on which a printed-circuit board 92 is mounted. A number of electronic parts (not shown) are mounted on the printed-circuit board 92.

As shown in FIG. 5, the spindle motor 60 is mounted on the main surface 81a with the spindle motor embedded in the concave portion of the main frame 81. The spindle motor 60 comprises a spindle shaft 61 which is rotatably supported with respect to the main frame 81 via a ball bearing (not shown) substantially perpendicular to the main surface 81a of the main frame 81. The spindle shaft 61 serves as the axis O of the rotation for the magnetic recording medium of the flexible disk loaded in the high-density type FDD. The disk holder table 82 is fixed to the spindle shaft 61 at an upper portion thereof. The disk holder table 82 has a main surface which extends to a direction perpendicular to a longitudinal direction (a direction of the axis O of the rotation) of the spindle motor 61.

That is, the disk holder table 82 is rotatably supported on the main surface 81a of the main frame 81 and holds the flexible disk loaded in the high-density type FDD so that the table center axis O (the axis of the rotation) coincides with the disk center axis of the flexible disk.

Figure 6A:
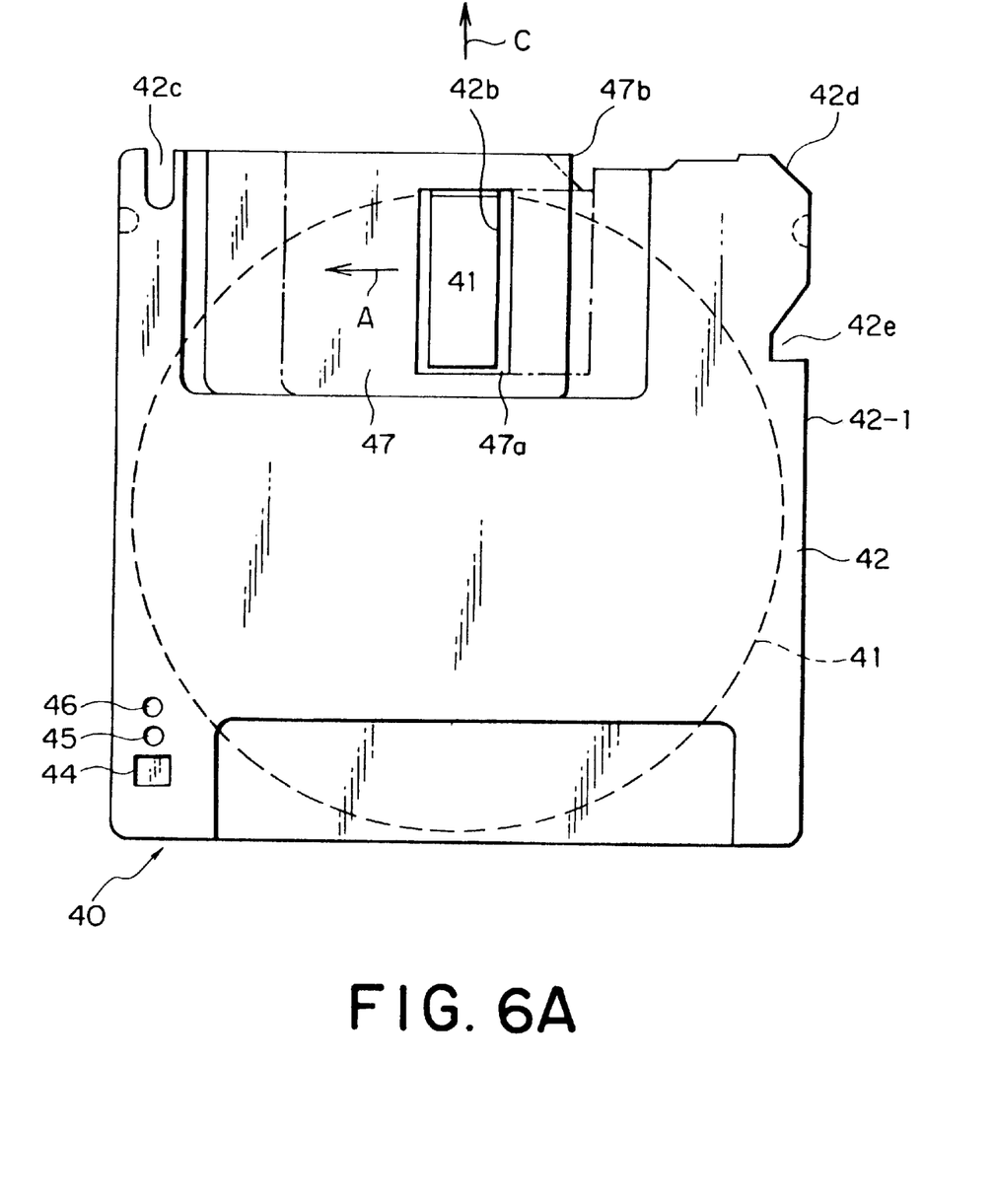
FIGS. 6A and 6B collectively show a large-capacity flexible disk (FD) loaded in the high-density type FDD illustrated in FIG. 5.
Figure 6B:
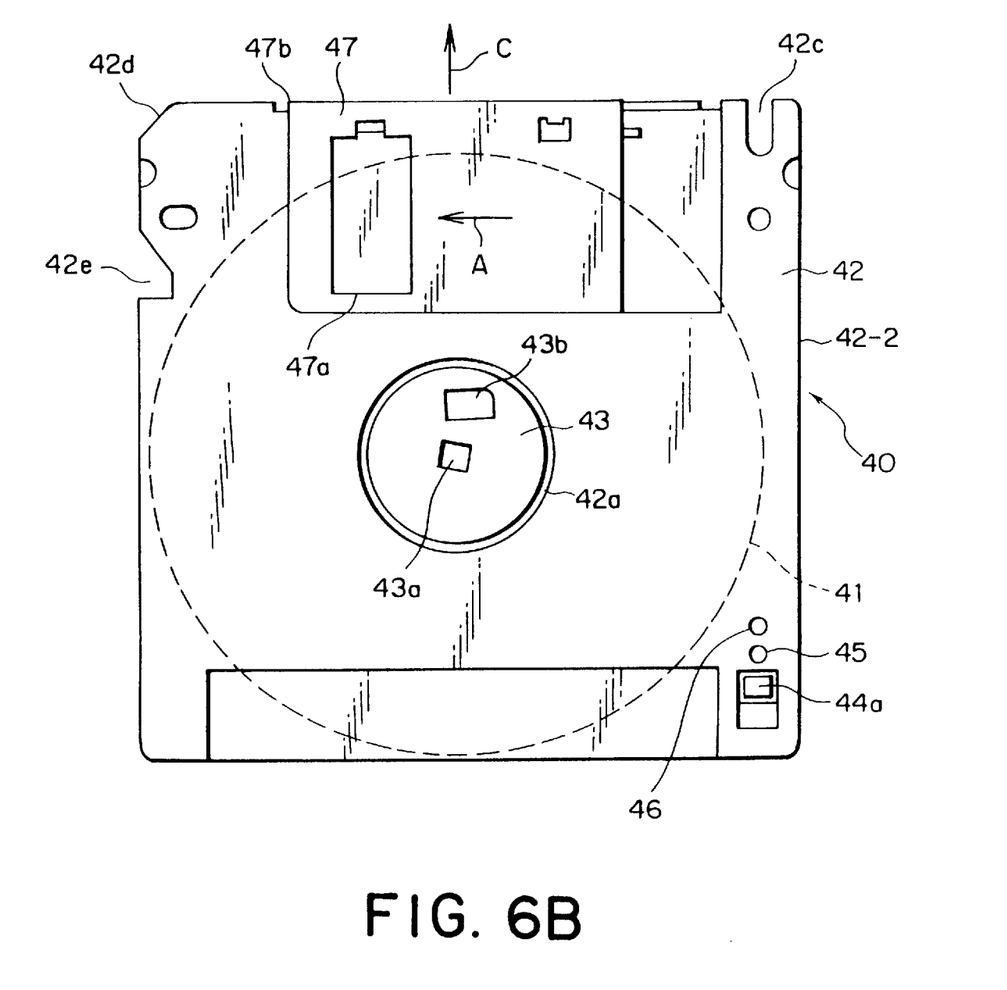

Turning to FIGS. 6A and 6B, description will proceed to the large-capacity FD depicted at 40. FIG. 6A is a plane view of the large-capacity FD 40 as seen from an upper surface side while FIG. 6B is a bottom view of the large-capacity FD 40 as seen from a lower surface side. The illustrated large-capacity FD 40 is a 3.5-inch type and comprises a magnetic recording medium 41, a jacket 42 for receiving or covering the magnetic recording medium 41. The jacket 42 consists of an upper shell 42-1 (FIG. 6A) having the upper surface and a lower shell 42-2 (FIG. 6B) having the lower surface.

As shown in FIG. 6B, in the lower shell 42-2, a jacket or shell circular opening 42a is formed at a center portion of the large-capacity FD 40. In the jacket circular aperture 42a is freely received a supporting hub 43 for supporting the magnetic recording medium 41. The supporting hub 43 has a hub center hole 43a at a center portion thereof and a chucking hole 43b at a position eccentric with the center position thereof. The hub center hole 43a has substantially a rectangular shape and receives the spindle shaft 61 (FIG. 5) therein in the manner which later be described. The chucking hole 43b freely receives a chucking pin or a drive roller 62 (FIG. 5) therein in the manner which will also later be described.

Turning back to FIG. 5 again in addition to FIG. 6A, the disk holder table 82 has a table diameter which is greater than that of the supporting hub 43 and which is smaller than that of the jacket circular opening 42a of the jacket 42.

The disk holder table 82 has a table driving oval hole 82a at a position corresponding to the chucking hole 43b. Through the table driving oval hole 82a, the chucking pin 62 is freely received in the chucking hole 43b of the flexible disk 40 in the manner which will later become clear. The disk holder table 82 is mounted on a magnetic case 63 at a bottom surface thereof. The chucking pin 62 is rotatably and movably mounted in the magnetic case 63 with the chucking pin 62 urged upwardly. Accordingly, the chucking pin 62 moves downwardly or sinks in the disk holder table 82 if any load is applied to the chucking pin 62 downwards. The magnetic case 63 comprises a circumferential wall (not shown) has an outer surface at a predetermined position of which an index detection magnet 64 of rectangular parallelepiped shape is fixed.

Referring to FIGS. 6A and 6B again, a write protection hole 44 is bored in the jacket 42 of the large-capacity FD 40 at a corner portion in rear and right-hand side with respect to the insertion direction C of FIG. 6B as view from the lower shell 42-2. In other words, the write protection hole 44 is bored in the jacket 42 of the large-capacity FD 40 at the corner portion in rear and left-hand side in the insertion direction C of FIG. 6A as viewed from the upper shell 42-1. FIG. 6B shows a state where the write protection hole 44 is shut by a write protection tab 44a. The write protection tab 44a manually enables to slide along a direction in parallel with the insertion direction C. It is possible to carry out opening and closing of the write protection hole 44 by operating the write protection tab 44a manually. When the write protection hole 44 is closed by the write protection tab 44a, the large-capacity FD 40 is put into a write enable state. When the write protection hole 44 is opened by the write protection tab 44a, the large-capacity FD 40 is put into a write disable state.

The illustrated large-capacity FD 40 shows a case where there is two types of storage capacity of, for example, 128 Mbytes and 256 Mbytes. In the vicinity of the write protection hole 44, a large-capacity identifier hole 45 is bored in the jacket 42 of the large-capacity FD 40. The large-capacity identifier hole 45 is for identifying the large-capacity FD 40 in distinction from the small-capacity FD 10 (FIG. 1). In addition, a type identifier hole 46 is selectively bored in the jacket 42 of the large-capacity FD 40 near the write protection hole 44 together with the large-capacity identifier 45. The type identifier hole 46 is for identifying a type of the large-capacity FD 40. It is possible to identify the type of the large-capacity FD 40 according to the presence or absence of the type identifier hole 46. It is assumed that the large-capacity FD 40 having the storage capacity of 128 Mbytes is referred to as a first type of the large-capacity FD while the large-capacity FD 40 having the storage capacity of 256 Mbytes is referred to as a second type of the large-capacity FD. In the example being illustrated, the type identifier hole 46 is not bored in the jacket 42 of the first type of the large-capacity FD while the type identifier hole 46 is bored in the jacket 42 of the second type of the large-capacity FD.

As is apparent from FIG. 1, the large-capacity identifier hole 45 and the type identifier hole 46 are not bored in the jacket of the small-capacity FD 10.

Turning back to FIG. 5 in addition to FIGS. 6A and 6B, on the printed-circuit board 92 mounted on the back surface of the main frame 81, the high-density type FDD further comprises a switch unit 50 at a corner position in rear and left-hand side with respect to the insertion direction C. The switch unit 50 comprises a plurality of push switches which will presently be described. The switch unit 50 is for detecting the presence or absence of the write protection hole 44, the large-capacity identifier hole 45, and the type identifier hole 46.

More specifically, the switch unit 50 comprises, as the push switches, a write control switch 51, a large-capacity detecting switch 52, and a type detecting switch 53. The write control switch 51 is a push switch for detecting the opening or closing state of the write protection hole 44. The write control switch 51 is disposed at a position corresponding to the write protection hole 44 when the large-capacity FD 44 is loaded in the high-density type FDD. The large-capacity detecting switch 52 is a push switch for detecting whether the loaded flexible disk is the large-capacity FD 40 or the small-capacity FD 10. The large-capacity detecting switch 52 is disposed at a position corresponding to the large-capacity identifier hole 45 when the large-capacity FD 40 is loaded in the high-density type FDD. The type detecting switch 53 is a push switch for detecting the presence or absence of the type identifier hole 45. The type detecting switch 53 is disposed at a position corresponding to the type identifier hole 46 when the large-capacity FD is loaded in the high-density type FDD.

Although illustration is omitted, a stator (not shown) of the spindle motor 60 comprises a frequency generation pattern (which is abbreviated an FG pattern hereinafter) for detecting the rotation speed thereof. The FG pattern generates an FG signal having pulses which in number to sixty during one rotation of the spindle motor 60. As is well known in the art, 300 rpm is equivalent to 5 Hz/rev while 3,600 rpm is equivalent to 60 Hz/rev. As a result, the FG pattern generates the FG signal having a frequency of 300 Hz if the magnetic recording medium 11 of the small-capacity FD 10 rotates at its prescribed rotation speed of 300 rpm by the spindle motor 60. Likewise, the FG pattern generates the FG signal having a frequency of 3,600 Hz if the magnetic recording medium 41 of the large-capacity FD 40 rotates at its prescribed rotation speed of 3,600 rpm by the spindle motor 60.

As shown in FIGS. 6A and 6B, the large-capacity FD 40 further comprises a shutter 47 at a front side thereof. The shutter 47 is silidable in the direction A in FIGS. 6A and 6B. The shutter 47 is provided with a shutter window 47a. The shutter 47 is urged by a shutter spring (not shown) like the shutter spring 21 (FIG. 1) in the closing direction A. When the shutter 47 makes sliding movement in a direction reverse to the closing direction A, the shutter window 47a of the shutter 47 is faced to a head window 42a formed in the jacket 42. At this time, it is possible to access the magnetic recording medium 41 by upper and lower magnetic heads (not shown) through the head window 42a.

Turning back to FIG. 5, the high-density type FDD includes a shutter drive mechanism for opening and closing the shutter 47 of the large-capacity FD 40, and ejector mechanism for ejecting the large-capacity FD 40, and a carriage locking mechanism for locking a direct-acting type carriage mechanism (which will later be described) after rejection of the large-capacity FD 40.

The high-density type FDD further comprises a lever unit 70. The lever unit 70 comprises en eject lever 71 and lock lever 72. The eject lever 71 serves both as a component of the shutter drive mechanism for opening and closing the shutter 47 and as a component of the ejector mechanism for ejecting the large-capacity FD 40 from the high-density type FDD. The lock lever 72 is located in the vicinity of the direct-acting type carriage mechanism and serves to lock the direct-acting type carriage mechanism upon ejection of the large-capacity FD 40.

The ejector mechanism comprises an eject bottom 54 projecting into an outer surface of a front bezel (not shown) of the high-density type FDD, an eject plate 55 for positioning the large-capacity FD 40 loaded through an insertion slot (not shown) of the front bezel so that one surface of the large-capacity FD 40 is faced to the eject plate 55, and a pair of eject springs (not shown) having one end engaged with the eject plate 55 and the other end engaged with a disk holder unit (not shown). The eject plate 55 has a rack 55a at its top end in a depth direction. The rack 55a is engaged with a pinion (not shown) rotatably supported on the main surface 81a of the main frame 81. The lever unit 70 is urged by a spring mechanism 73 in a counterclockwise direction.

It is assumed that the large-capacity FD 40 is loaded into the disk holder unit of the high-density type FDD. Specifically, when the large-capacity FD 40 is inserted in the direction depicted at the arrow C in FIG. 5, a top end 71a of the eject lever 71 is engaged with an upper end 47b of a right side edge of the shutter 47. With the movement of the large-capacity FD 40 in the insertion direction C, the lever unit 70 is rotated in a clockwise direction. Consequently, the shutter 47 is forced by the top end 71a of the eject lever 71 to make sliding movement in the direction reverse to the closing direction A.

When the large-capacity FD 40 is completely received in the disk holder unit of the high-density type FDD, the disk holder unit comes down and then the large-capacity FD 40 is locked by a disk lock mechanism (not shown) to be stably held in the disk holder unit. In this state, engagement between side arms (not shown) of the carriage assembly and the disk holder unit is released and the shutter window 47a of the shutter 47 is located directly above the head window 42b of the jacket 42, as illustrated in FIG. 6A. Accordingly, the upper and the lower magnetic heads are in contact with the magnetic recording medium 41 of the large-capacity FD 40 through the shutter window 47a of the shutter 47 and the head window 42b of the jacket 42. The shutter 47 is urged by the shutter spring to be located at a position indicated by a dash-and-dot line in FIG. 6A.

The high-density type FDD comprises a pair of magnetic heads (not shown) for reading/writing data from/to the magnetic recording medium 41 in the large-capacity FD 40. The magnetic heads are supported via gimbals 84 with a carriage 85. A combination of the gimbals 84 and the carriage 85 is called the carriage assembly. The carriage 85 is disposed over the main surface 81a of the main frame 81 with a space left therebetween. The carriage 85 supports the magnetic heads movably along a predetermined radial direction (i.e. a direction indicated by an arrow D in FIG. 5) with respect to the large-capacity FD 40.

The carriage 85 is supported and guided at both lower sides thereof by a pair of guide bars 86 which extend to directions in parallel with the predetermined radial direction D. The carriage assembly in driven in the predetermined radial direction D by a voice coil motor (VCM) which will presently be described. As shown in FIG. 5, the carriage assembly is provided with a pair of voice coils 87 at opposite rear sides thereof. The voice coils 87 act as components of the voice coil motor.

Now, description will be made as regards the voice coil motor (VCM). The voice coil motor comprises the pair of voice coils 87 located at the opposite rear sides of the carriage assembly and wounded around drive axes parallel to the predetermined radial direction D, and a pair of magnetic circuits 90 for producing magnetic fields intersecting electric currents flowing through the voice coils 87. In the voice coil motor of the above-mentioned structure, when the electric current is made to flow through each of the voice coils 87 in a direction intersecting the magnetic field produced by the magnetic circuits 90, a drive force is generated in an extending direction of each drive axis as a result of interaction between the electric current and the magnetic field. The drive force causes the voice coil motor to make the carriage assembly move in the predetermined radial direction D.

Turning back to FIGS. 6A and 6B, the jacket 42 has a first notch 42c formed on a forward side thereof in the insertion direction C. The jacket 42 further has a second notch 42e formed on a lateral side provided with a chamfered portion 42d for preventing reverse insertion (wrong insertion in a vertical direction or in the insertion direction C). The second notch 42e has a particular shape and is formed at a particular position so that the second notch 42e in reverse insertion preventing lever (not shown) of the small-density exclusive type FDD. In other words, the jacket of the small-capacity FD 10 (FIG. 1) does not have the first and the second notches 42c and 42e.

Figure 7A:
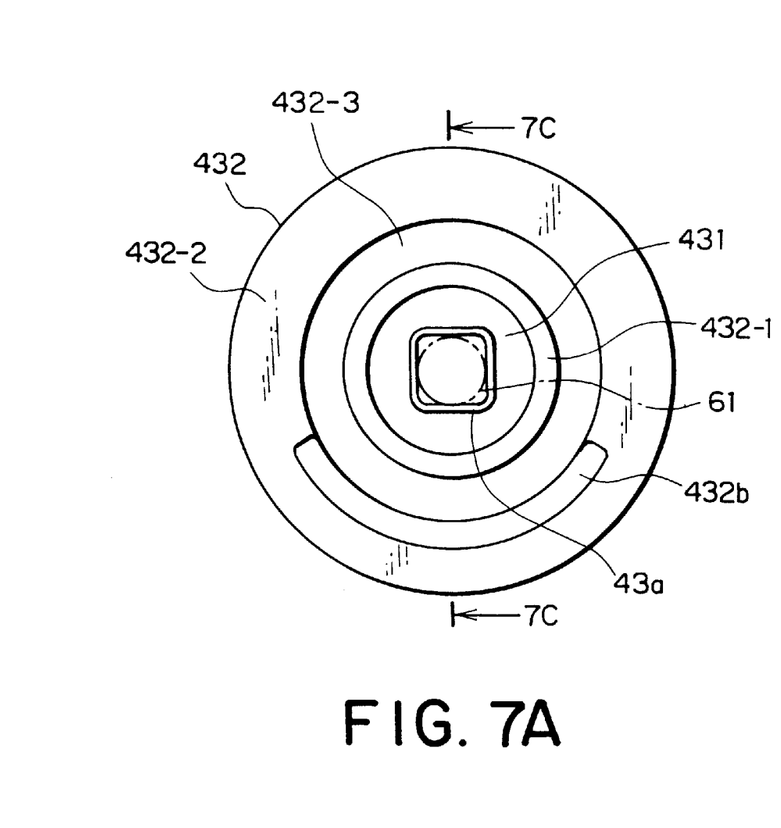
FIGS. 7A through 7D collectively show a supporting hub according to a preferred embodiment of this invention for use in the large-capacity FD illustrated in FIGS. 6A and 6B.
Figure 7B:
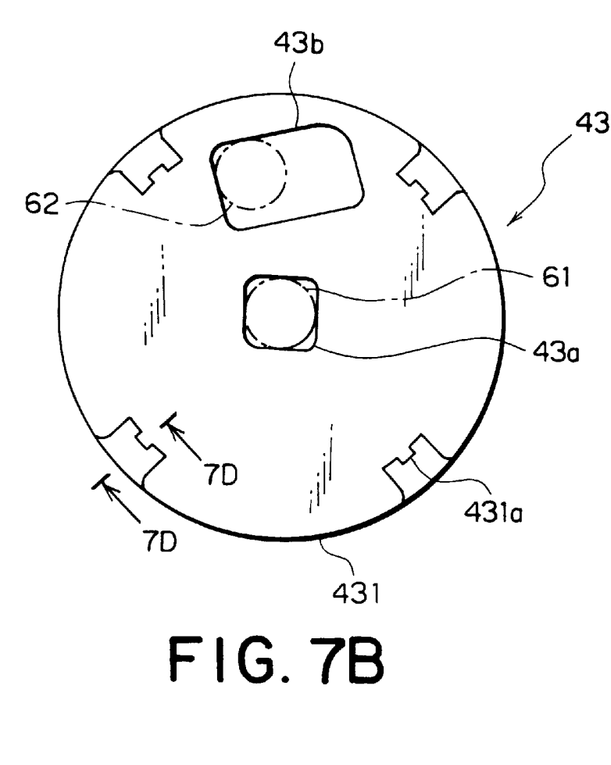
Figure 7C:
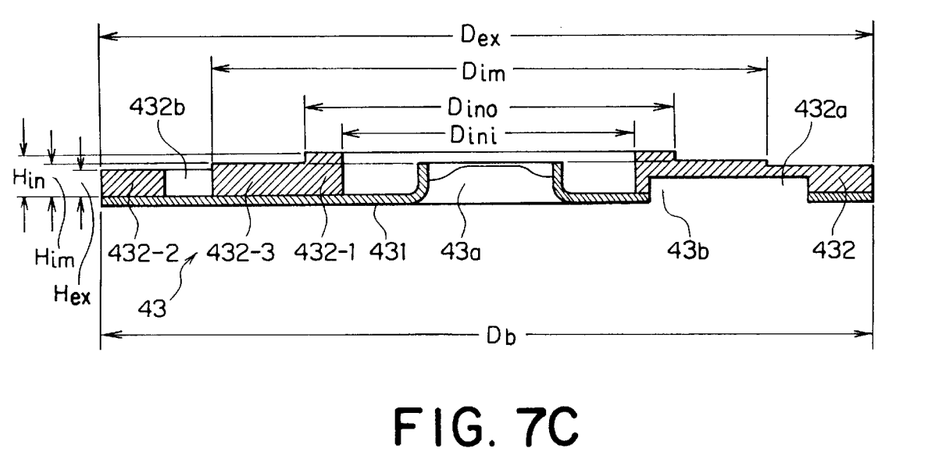
Figure 7D:
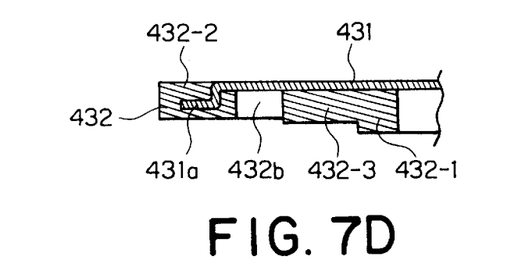

Referring to FIGS. 7A through 7D, the description will proceed to the supporting hub 43 illustrated in FIG. 6B. FIG. 7A is a top plan view of the supporting hub 43, FIG. 7B is a bottom plan view, FIG. 7C is a cross-sectional view taken substantially along the lines 7C—7C of FIG. 7A, and FIG. 7D is a cross-sectional view taken substantially along the lines 7D—7D of FIG. 7B.

The supporting hub 43 comprises a bottom portion 431 and a supporting body or member 432 which is integrally fixed on the bottom portion 431. The bottom portion 431 is made of a rigid material such as a metal plate. As shown in FIG. 7B, the bottom portion 431 has the hub center hole 43a and the chucking hole 43b in which the spindle shaft 61 and the chucking pin 62 are inserted, respectively. The bottom portion 431 is freely inserted in the jacket circular opening 42a (FIG. 6B) with the bottom portion 431 exposed to the exterior of the jacket 42 or the lower shell 42-2. The bottom portion 432 has a bottom diameter $D_b$ which is substantially equal to the cylindrical outer or concave diameter $D_c$ of the cylindrical portion 161 of the metal hub 16 (FIG. 2). In the example being illustrated, the bottom diameter $D_b$ is equal to about 25 mm.

The supporting body 432 is for supporting the magnetic recording medium 41. The supporting body 432 is formed by molding of synthetic resin and has an annular shape with a three-step in structure in a radial direction. Specifically, the supporting body 432 comprises an internal ring-shaped portion 432-1, an external ring-shaped portion 432-2, and an intermediate ring-shaped portion 432-3 sandwiched between the internal and the external ring-shaped portions 432-1 and 432-2. The internal, the external, and the intermediate ring-shaped portions 432-1 to 432-3 have a common bottom surface which is in contact with an upper surface of the bottom portion 431. But, the internal, the external, and the intermediate ring-shaped portions 432-1 to 432-3 have different top surfaces. In other words, the internal, the external, and the intermediate ring-shaped portions 432-1 to 432-3 have different thicknesses or heights.

More specifically, the internal, the external, and the intermediate ring-shaped portions 432-1 to 432-3 have internal, external, and intermediate top surfaces, respectively, and have internal, external, and intermediate heights $H_{in}$, $H_{ex}$, and $H_{im}$, respectively. As shown in FIG. 7C, the intermediate height $H_{im}$ is lower than the internal height $H_{in}$ and is higher than the external height $H_{ex}$. The intermediate ring-shaped portion 432-3 supports the magnetic recording medium 41 on the intermediate top surface at an inner circumferential edge in a lower surface of the magnetic recording medium 41. That is, the intermediate ring-shaped portion 432-3 serves as a supporting rest for supporting the magnetic recording medium 41.

In addition, the internal ring-shaped portion 432-1 has an inner internal diameter $D_{ini}$ and an outer internal diameter $D_{ino}$. The external ring-shaped portion 432-2 has an external diameter $D_{ex}$ while the intermediate ring-shaped portion 432-3 has an intermediate diameter $D_{im}$. The external diameter $D_{ex}$ of the external ring-shaped portion 432-2 is substantially equal to the bottom diameter $D_b$ of the bottom portion 432 and is equal to, for example, about 25 mm. In the example being illustrated, the inner internal diameter $D_{ini}$, the outer internal diameter $D_{ino}$, and the intermediate diameter Dim are equal to about 9.5 mm, 12 mm, and 17 mm, respectively.

As shown in FIG. 7C, the supporting body 432 has a bore 432a which communicates with the chucking hole 43b. The supporting body 432 has a groove 432b bored in the external ring-shaped portion 432-2.

As shown in FIGS. 7B and 7D, the bottom portion 431 has four bent portions 431a at an outer circumferential edge thereof that are bend upwards. Each bent portion 431a is embedded in the external ring-shaped portion 432-2 as shown in FIG. 7D.

Figure 8:
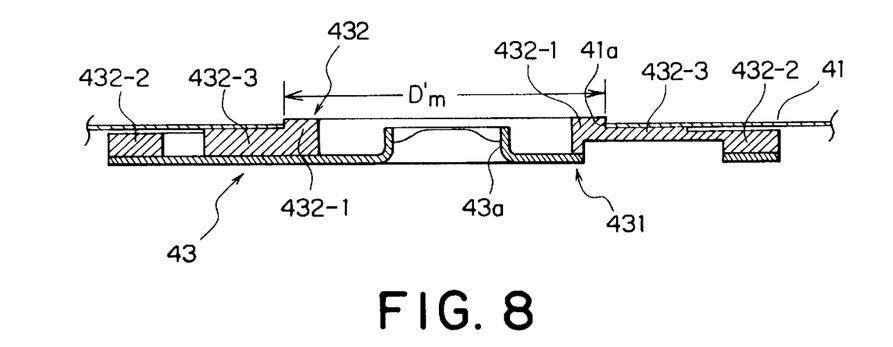
FIG. 8 is a sectional view of a part of a combination of a magnetic recording medium and the supporting hub illustrated in FIGS. 7A through 7D.

FIG. 8 shows a combination of the supporting hub 43 and the magnetic recording medium 41. The magnetic recording medium 41 is fixed on or adhered to the supporting rest 432-3 of the supporting body 432, for example, through an A ring or adhesive. The magnetic recording medium 41 has a medium circular opening 41a which has a medium opening diameter $D'_m$, Inasmuch as the magnetic recording medium 41 is mounted on the supporting rest 432-3 of the supporting body 432, the medium opening diameter $D'_m$ is greater than the outer internal diameter $D_{ino}$ of the internal ring-shaped portion 432-2 and is smaller than the intermediate diameter $D_{im}$ of the intermediate ring-shaped portion 432-3.

In the example being illustrated, the magnetic recording medium 41 is fixed on or adhered to the supporting rest 432-3 with an inner circumferential end of the magnetic recording medium 41 engaged with a cylindrical wall between the internal ring-shaped portion 432-1 and the intermediate ring-shaped portion 432-3. Accordingly, the medium opening diameter $D'_m$ of the medium circular opening 41a is nearly equal to the outer internal diameter $D_{ino}$ of the internal ring-shaped portion 432-1. Inasmuch as the outer internal diameter $D_{ino}$ of the internal ring-shaped portion 432-1 is equal to about 12 mm, the medium opening diameter $D'_m$ of the medium circular opening 41a is substantially equal to 12 mm.

In contrast with this, the conventional magnetic recording medium 11 has the medium circular opening 11a with the medium opening diameter $D_m$ which is larger than 25 mm.

Inasmuch as the magnetic recording medium 11 is fixed on the supporting rest 432-3 of the supporting body 432, which is positioned inside of the bottom portion 431, at the inner circumferential edge in the bottom surface of the magnetic recording medium 11, although the magnetic recording medium 41 may suffer occurrence of stuck wrinkles in the vicinity of medium stuck positions where the magnetic recording medium 41 is adhered to the supporting hub 43, such stuck wrinkles may mostly occur in an area inside of the bottom portion 431. Accordingly, the contact or "head touch" becomes stable in spite of the presence of such stuck wrinkles when the magnetic heads of the flexible disk drive are brought into contact with the magnetic recording medium 41 for writing/reading operations. As a result, it is possible for the magnetic heads to perform stable data writing/reading operations upon the magnetic recording medium 41 and it is possible to prevent the occurrence of writing/reading errors. This is because the writing/reading operations for the magnetic recording medium 41 by the magnetic heads are carried out in a data writing/reading area apart from the medium stuck positions and such stuck wrinkles on the magnetic recording medium 41 have little effect on the data writing/reading area.

While this invention has thus far been described in conjunction with preferred examples thereof, it will now be readily possible for those skilled in the art to put this invention into various other manners. For example, adhering of the magnetic recording medium and the supporting hub is not restricted to adhesive bonding, and other adhering techniques may be used.

What is claimed is:

1. A flexible disk comprising:
    a magnetic recording medium having an annular shape with a medium circular opening formed at its center;
    a jacket for receiving said magnetic recording medium, said jacket comprising upper and lower shells between which said magnetic recording medium is interposed, the lower shell having a jacket circular opening formed at its center; and
    a supporting hub for supporting said magnetic recording medium, said supporting hub comprising a bottom portion which is freely inserted in the jacket circular opening with the bottom portion exposed to the exterior of the jacket, and a supporting body which is integrally fixed on the bottom portion, said supporting body including a supporting rest for supporting said magnetic recording medium by adhering at an inner circumferential edge in a lower surface of said magnetic recording medium inside of the bottom portion.

2. A flexible disk as claimed in claim 1, wherein the adhering is adhesive bonding.

3. A flexible disk comprising:
    a magnetic recording medium having an annular shape with a medium circular opening formed at its center, the medium circular opening having a medium opening diameter;
    a jacket for receiving said magnetic recording medium, said jacket comprising upper and lower shells between which said magnetic recording medium is interposed, the lower shell having a jacket circular opening formed at its center; and
    a supporting hub for supporting said magnetic recording medium, said supporting hub comprising a bottom portion which is freely inserted in the jacket circular opening with the bottom portion exposed to the exterior of the jacket, said bottom portion having a bottom diameter which is greater than the medium opening diameter, said supporting hub further comprising a supporting body which is integrally fixed on the bottom portion, said supporting body having an external diameter which is substantially equal to the bottom diameter of said bottom portion, said supporting body including a supporting rest for supporting said magnetic recording medium by adhering at an inner circumferential edge in a lower surface of said magnetic recording medium inside of the bottom portion.

4. A flexible disk as claimed in claim 3, wherein the adhering is adhesive bonding.

5. A flexible disk as claimed in claim 3, wherein the medium opening diameter of the medium circular opening of said magnetic recording medium is substantially equal to 12 mm.

6. A flexible disk as claimed in claim 3, wherein said bottom portion is made of a rigid material, said supporting body being made by molding of synthetic resin.

7. A flexible disk as claimed in claim 6, wherein the rigid material of said bottom portion is a metal plate.

8. A flexible disk as claimed in claim 3, wherein said supporting body comprises:
    an internal ring-shaped portion having an internal height;
    an external ring-shaped portion having an external height which is lower than the internal height; and an intermediate ring-shaped portion sandwiched between said internal and the said external ring-shaped portions, said intermediate ring-shaped portion having an intermediate height which is higher than the external height and which is lower than the internal height, said internal ring-shaped portion serving as said supporting rest.

9. A flexible disk as claimed in claim 8, wherein said internal ring-shaped portion has an outer internal diameter which is substantially equal to the medium opening diameter of the medium circular opening of said magnetic recording medium.

10. A flexible disk as claimed in claim 9, wherein the outer internal diameter of said internal ring-shaped portion is equal to about 12 mm.

11. A flexible disk as claimed in claim 8, wherein said bottom portion has a plurality of bent portions at an outer circumferential edge thereof that are bent upwards, each bent portion being embedded in the external ring-shaped portion.

12. A flexible disk as claimed in claim 3, wherein said bottom portion has a hub center hole and a chucking hole in which a spindle shaft and a chucking pin are inserted, respectively, said supporting body having a bore which communicates with the chucking hole.

13. A supporting hub for supporting a magnetic recording medium having an annular shape with a medium circular opening formed at its center, said supporting hub comprising:

a bottom portion; and a supporting body integrally fixed on the bottom portion, said supporting body including a supporting rest for supporting said magnetic recording medium by adhering at an inner circumferential edge in a lower surface of said magnetic recording medium inside of the bottom portion.

14. A supporting hub as claimed in claim 13, wherein the adhering is adhesive bonding.

15. A supporting hub for supporting a magnetic recording medium having an annular shape with a medium circular opening formed at its center, the medium circular opening having a medium opening diameter, said supporting hub comprising:

a bottom portion having a bottom diameter which is greater than the medium opening diameter; and a supporting body integrally fixed on the bottom portion and having an external diameter which is substantially equal to the bottom diameter of said bottom portion, said supporting body including a supporting rest for supporting said magnetic recording medium by adhering at an inner circumferential edge in a lower surface of said magnetic recording medium inside of the bottom portion.

16. A supporting hub as claimed in claim 15, wherein the adhering is adhesive bonding.

17. A supporting hub as claimed in claim 15, wherein said bottom portion is made of a rigid material, said supporting body being made by molding of synthetic resin.

18. A supporting hub as claimed in claim 17, wherein the rigid material of said bottom portion is a metal plate.

19. A supporting hub as claimed in claim 15, wherein said supporting body comprises:

an internal ring-shaped portion having an internal height;

an external ring-shaped portion having an external height which is lower than the internal height; and an intermediate ring-shaped portion sandwiched between said internal and the said external ring-shaped portions, said intermediate ring-shaped portion having an intermediate height which is higher than the external height and which is lower than the internal height, said internal ring-shaped portion serving as said supporting rest.

20. A supporting hub as claimed in claim 19, wherein said internal ring-shaped portion has an outer internal diameter which is substantially equal to the medium opening diameter of the medium circular opening of said magnetic recording medium.

21. A supporting hub as claimed in claim 20, wherein the outer internal diameter of said internal ring-shaped portion is equal to about 12 mm.

22. A supporting hub as claimed in claim 19, wherein said bottom portion has a plurality of bent portions at an outer circumferential edge thereof that are bent upwards, each bent portion being embedded in the external ring-shaped portion.

23. A supporting hub as claimed in claim 15, wherein said bottom portion has a hub center hole and a chucking hole in which a spindle shaft and a chucking pin are inserted, respectively, said supporting body having a bore which communicates with the chucking hole.

* * * * *